United States Patent
Li

(10) Patent No.: US 11,985,599 B2
(45) Date of Patent: May 14, 2024

(54) CHANNEL MONITORING METHOD AND DEVICE

(71) Applicant: BEIJING XIAOMI MOBILE SOFTWARE CO., LTD., Beijing (CN)

(72) Inventor: Yanhua Li, Beijing (CN)

(73) Assignee: BEIJENG XIAOMI MOBILE SOFTWARE CO, LTD., Beijing (CN)

( * ) Notice: Subject to any disclaimer, the term of this patent is extended or adjusted under 35 U.S.C. 154(b) by 460 days.

(21) Appl. No.: 17/234,553

(22) Filed: Apr. 19, 2021

(65) Prior Publication Data

US 2021/0243694 A1    Aug. 5, 2021

Related U.S. Application Data

(63) Continuation of application No. PCT/CN2018/111067, filed on Oct. 19, 2018.

(51) Int. Cl.
*H04W 76/28* (2018.01)
*H04W 52/02* (2009.01)

(52) U.S. Cl.
CPC ....... *H04W 52/0235* (2013.01); *H04W 76/28* (2018.02)

(58) Field of Classification Search
CPC . H04W 52/0235; H04W 76/28; H04W 76/27; H04W 24/02; H04W 52/0212; Y02D 30/70; H04B 17/30
See application file for complete search history.

(56) References Cited

U.S. PATENT DOCUMENTS

| | | | | |
|---|---|---|---|---|
| 8,588,831 | B2 * | 11/2013 | Chen ................. | H04W 52/0216 455/220 |
| 11,178,618 | B2 * | 11/2021 | He .................... | H04W 28/0284 |
| 11,516,735 | B2 * | 11/2022 | Thangarasa .......... | H04W 76/28 |
| 11,706,715 | B2 * | 7/2023 | He .................... | H04W 52/0229 370/311 |
| 2010/0184443 | A1 * | 7/2010 | Xu .................... | H04W 52/0216 455/450 |

(Continued)

FOREIGN PATENT DOCUMENTS

| CN | 102932882 A | 2/2013 |
|---|---|---|
| CN | 103945505 A | 7/2014 |

(Continued)

OTHER PUBLICATIONS

International Search Report issued in PCT Application No. PCT/CN2018/111067 dated Jul. 18, 2019 with English translation, (4p).

(Continued)

*Primary Examiner* — Julio R Perez

(74) *Attorney, Agent, or Firm* — Arch & Lake LLP

(57) ABSTRACT

The present disclosure provides a channel monitoring method and a channel monitoring apparatus. The method is applied to a base station and includes: configuring a first discontinuous reception (DRX) parameter for a terminal for channel monitoring; determining a first power saving signal for indicating the first DRX parameter; sending the first power saving signal to the terminal for the terminal to determine the corresponding first DRX parameter based on the first power saving signal and perform corresponding channel monitoring based on the first DRX parameter.

17 Claims, 9 Drawing Sheets

(56) References Cited

U.S. PATENT DOCUMENTS

| | | | | |
|---|---|---|---|---|
| 2010/0255835 | A1* | 10/2010 | Suzuki | H04L 1/1829 |
| | | | | 455/425 |
| 2019/0239189 | A1* | 8/2019 | Hwang | H04W 52/0216 |
| 2021/0243694 | A1* | 8/2021 | Li | H04W 76/28 |
| 2022/0039008 | A1* | 2/2022 | Nimbalker | H04W 52/02 |
| 2022/0279442 | A1* | 9/2022 | Luo | H04W 52/0235 |
| 2023/0018840 | A1* | 1/2023 | Li | H04W 52/0235 |
| 2023/0239796 | A1* | 7/2023 | Li | H04W 52/0235 |
| | | | | 370/311 |

FOREIGN PATENT DOCUMENTS

| | | | |
|---|---|---|---|
| CN | 106604376 A | 4/2017 | |
| CN | 107431982 A | 12/2017 | |
| CN | 109429310 A | 3/2019 | |
| WO | 2018174635 A1 | 9/2018 | |
| WO | WO-2018174635 A1 * | 9/2018 | H04W 52/02 |

OTHER PUBLICATIONS

Ericsson, "DRX Framework for NR", 3GPP TSG-RAN WG2 NR Ad Hoc, R2-1700411, Spokane, Washington, Jan. 17-19, 2017, (7p).

Huawei, HiSilicon, "DRX Configuration in NR", 3GPP TSG-RAN WG2 NR Adhoc, Qingdao, China, R2-1706474, update to R2-1705206, Jun. 27-30, 2017, (6p).

Ericsson, "DRX Enhancement for NR-U", 3GPP TSG-RAN WG2 #103-Bis,Chengdu, China, R2-1815027, Oct. 8-12, 2018, (5p).

LG Electronics, "Discussion on Power Saving Signal/Channel Function", 3GPP TSG RAN WG1 Meeting 90bis, R1-1717272, Prague, Czech Republic, Oct. 9-13, 2017, (9p).

Xiaomi Communications, "Initial Views on the PDCCH Monitoring for Power Saving", 3GPP TSG RAN WG1 Meeting #94bis, R1-1811392, Chengdu China, Oct. 8-12, 2018, (3p).

State Intellectual Property Office of the People's Republic of China, Office Action and Search Report Issued in Application No. 201880002288.2, Oct. 11, 2021, 30 pages. (Submitted with Machine Translation).

State Intellectual Property Office of the People's Republic of China, Office Action and Search Report Issued in Application No. 201880002288.2, Jul. 5, 2021, 29 pages.

ISA State Intellectual Property Office of the People's Republic of China, Written Opinion of the International Searching Authority Issued in Application No. PCT/CN2018/111067, Jul. 18, 2019, WIPO, 10 pages.

ZTE, Sanechips, "Power consumption reduction for physical channels for MTC", 3GPP TSG RAN WG1 Meeting #92bis, Sanya, China, R1-1804189, Apr. 16-20, 2018, 5 pages.

* cited by examiner

CHANNEL MONITORING METHOD AND DEVICE

CROSS-REFERENCE OF RELATED APPLICATION

This application is a continuation of International Application No. PCT/CN/2018/111067 filed on Oct. 19, 2018, the disclosure of which is incorporated herein by reference in its entirety for all purposes.

TECHNICAL FIELD

The present disclosure relates to the field of communication technology, and in particular to a channel monitoring method and a channel monitoring apparatus.

BACKGROUND

Discontinuous reception (DRX) means that a terminal stops monitoring a channel for a period of time to save power. In related art, DRX parameters are generally statically configured. However, the statically configured DRX parameters have poor flexibility, which reduces the efficiency of channel monitoring.

SUMMARY

In order to overcome the problems existing in the related art, examples of the present disclosure provide a channel monitoring method and apparatus.

According to a first aspect of the present disclosure, a channel monitoring method is provided, which is applied to a base station and includes: configuring a first discontinuous reception (DRX) parameter for a terminal for channel monitoring; determining a first power saving signal for indicating the first DRX parameter; sending the first power saving signal to the terminal for the terminal to determine the first DRX parameter based on the first power saving signal and perform a corresponding channel monitoring based on the first DRX parameter.

According to a second aspect of the present disclosure, a channel monitoring method is provided, which is applied to a terminal and includes: receiving a first power saving signal for indicating a first DRX parameter sent by a base station, wherein the first DRX parameter is a DRX parameter configured by the base station for the terminal for channel monitoring; determining the corresponding first DRX parameter based on the first power saving signal; performing corresponding channel monitoring based on the first DRX parameter.

According to a third aspect of the present disclosure, a channel monitoring apparatus is provided, which is applied to a base station and includes: a first configuration module, configured to configure a first discontinuous reception (DRX) parameter for a terminal for channel monitoring; a signal determining module, configured to determine a first power saving signal for indicating the first DRX parameter; a first sending module, configured to send the first power saving signal to the terminal for the terminal to determine the first DRX parameter based on the first power saving signal and perform corresponding channel monitoring based on the first DRX parameter.

According to a fourth aspect of the present disclosure, a channel monitoring apparatus is provided, which is applied to a terminal and includes: a receiving module, configured to receive a first power saving signal for indicating a first DRX parameter sent by a base station, wherein the first DRX parameter is a DRX parameter configured by the base station for the terminal for channel monitoring; a parameter determining module, configured to determine the first DRX parameter based on the first power saving signal; a channel monitoring module, configured to perform a corresponding channel monitoring based on the first DRX parameter.

According to a fifth aspect of the present disclosure, a non-transitory computer-readable storage medium storing a computer program is provided, where the computer program is to execute the channel monitoring method of the first aspect described above.

According to a sixth aspect of the present disclosure, a non-transitory computer-readable storage medium storing a computer program is provided, where the computer program is to execute the channel monitoring method of the second aspect described above.

According to a seventh aspect of the present disclosure, a channel monitoring apparatus provided, which is applied to a base station and includes: a processor; a memory storing processor-executable instructions. The processor is configured to: configure a first discontinuous reception (DRX) parameter for a terminal for channel monitoring; determine a first power saving signal for indicating the first DRX parameter; and send the first power saving signal to the terminal for the terminal to determine the first DRX parameter based on the first power saving signal and perform a corresponding channel monitoring based on the first DRX parameter.

According to an eighth aspect of the present disclosure, a channel monitoring apparatus provided, which is applied to a terminal and includes: a memory storing processor-executable instructions; wherein the processor is configured to: receive a first power saving signal for indicating a first DRX parameter sent by a base station, wherein the first DRX parameter is a DRX parameter configured by the base station for the terminal for channel monitoring; determine the first DRX parameter based on the first power saving signal; and perform corresponding channel monitoring based on the first DRX parameter.

It should be understood that the above general description and the following detailed description are only exemplary and explanatory and are not restrictive of the present disclosure.

BRIEF DESCRIPTION OF THE DRAWINGS

The drawings herein are incorporated into the specification and constitute a part of the specification, show embodiments in accordance with the present disclosure, and together with the specification are used to explain the principle of the present disclosure.

DETAILED DESCRIPTION OF THE EMBODIMENTS

The exemplary embodiments will be described in detail here, and examples thereof are illustrated in the accompanying drawings. When the following description refers to the accompanying drawings, unless otherwise indicated, the same reference signs in different drawings designate the same or similar elements. The implementation manners described in the following exemplary embodiments do not represent all the implementation manners consistent with the present disclosure. Rather, they are merely examples of devices and methods consistent with some aspects of the present invention as detailed in the appended claims.

The terms used in the present disclosure are only for the purpose of describing specific embodiments, and are not intended to limit the present disclosure. The singular forms "a", "said" and "the" used in the present disclosure and appended claims are also intended to include plural forms, unless the context clearly indicates other meanings. It should further be understood that the term "and/or" used herein refers to and includes any or all possible combinations of one or more associated listed items.

It should be understood that although the terms first, second, third, etc. may be used in the present disclosure to describe various information, the information should not be limited to these terms. These terms are only used to distinguish the same type of information from each other. For example, without departing from the scope of the present disclosure, first information may be referred as second information; and similarly, second information may also be referred as first information. Depending on the context, the word "if" as used herein can be interpreted as "upon" or "when" or "in response to determination".

Figure 1:
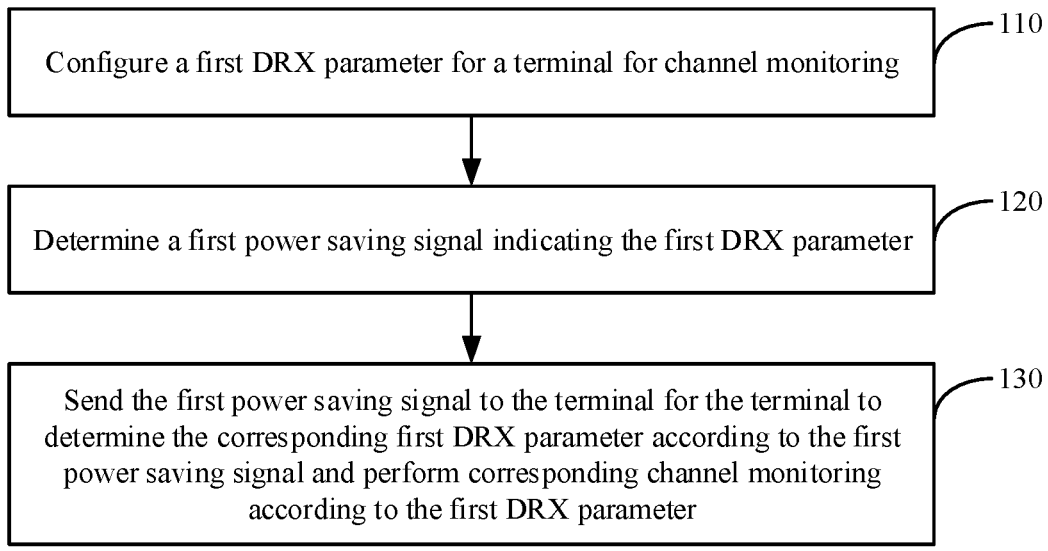
FIG. 1 is a flowchart illustrating a channel monitoring method according to an example.
Figure 2:
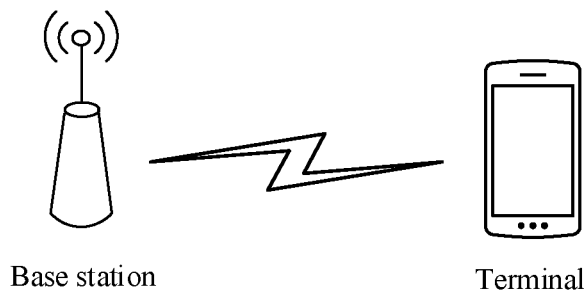
FIG. 2 is an application scenario illustrating a channel monitoring method according to an example.

FIG. 1 is a flowchart illustrating a channel monitoring method according to an example. FIG. 2 is an application scenario illustrating a channel monitoring method according to an example. The channel monitoring method may be applied in a base station. As shown in FIG. 1, the channel monitoring method may include the following steps 110-130.

At step 110, a first DRX parameter is configured for a terminal for channel monitoring.

In the embodiments of the present disclosure, to save the power, the base station can dynamically configure the first DRX parameter for channel monitoring based on actual conditions. Configuring the first DRX parameter means that a value of the first DRX parameter is configured. Performing the channel monitoring means that the channel is monitored based on the value of the first DRX parameter.

In one or more embodiments, the first DRX parameter in step 110 may include at least one of the following parameters:

(1-1) a DRX wake-up duration configured for monitoring physical downlink control channel (PDCCH) and/or monitoring physical downlink shared channel (PDSCH);

(1-2) a DRX inactivity timer configured to delay the DRX wake-up duration;

(1-3) a short DRX cycle;

(1-4) a long DRX cycle; and (1-5) a DRX short cycle timer configured to enter the long DRX cycle after the DRX short cycle timer expires.

In (1-1), the DRX wake-up duration is used to configure a duration for monitoring the PDCCH and/or monitoring the PDSCH in a DRX cycle. During this duration, the terminal is in a wake-up state.

In (1-2), the DRX inactivity timer is mainly used to delay the DRX wake-up duration. For example, in a later period of the DRX wake-up duration, a network side happens to have a large number of data to be sent to the terminal, and the remaining DRX wake-up duration is not long enough for transmitting this large packet. If the terminal enters a sleep stage at this time, it can only complete the transmission of the packet when the next DRX wake-up duration comes, which increases the processing delay of the entire service. To avoid this situation, a DRX inactivity timer is introduced, which can reduce the data processing delay.

In (1-3), (1-4), and (1-5), the system can configure a short DRX cycle or a long DRX cycle for the terminal according to different service scenarios that require different durations of DRX cycles. If both the short DRX cycle and the long DRX cycle are configured, when the DRX short cycle timer expires, the terminal may enter the long DRX cycle. For example, if a value of the short DRX cycle timer indicates two short DRX cycles, it means that the long DRX cycle is entered without successfully decoding the PDCCH within two short DRX cycles.

At step 120, a first power saving signal indicating the first DRX parameter is determined.

In the embodiments of the present disclosure, the base station binds a power saving signal and a DRX parameter, which means that the power saving signal can indicate the corresponding DRX parameter, so that the base station can use the power saving signal to quickly realize the dynamic configuration of the DRX parameter.

In one embodiment, the first power saving signal indicating the first DRX parameter may be a wake-up signal (WUS) or a go to sleep signal (GTS).

The WUS and GTS are signals introduced in a new generation communication system of new radio (NR). WUS is a low-power detection signal and a monitoring occasion (WUS MO) is set for the WUS. The WUS MO is located before the DRX wake-up duration. When the terminal detects the WUS in the WUS MO, it means that the terminal continues to monitor the PDCCH during the DRX wake-up duration, otherwise there is no need to monitor the subsequent PDCCH during the DRX wake-up duration. In addition, the GTS instructs the terminal quickly enter a sleep state, which means that the terminal no longer monitors the PDCCH and enters the sleep state.

At step 130, the first power saving signal is sent to the terminal for the terminal to determine the corresponding first DRX parameter according to the first power saving signal and perform corresponding channel monitoring according to the first DRX parameter.

In an exemplary scenario, as shown in FIG. 2, a base station and a terminal are included. After the base station configures the first DRX parameter for channel monitoring for the terminal, the base station may first determine the first power saving signal for indicating the first DRX parameter (e.g., WUS) and send the first power saving signal (e.g., WUS) to the terminal, so that the terminal can determine the corresponding first DRX parameter according to the first power saving signal (e.g., WUS) and perform the corresponding channel monitoring according to the first DRX parameter.

It can be seen from the above embodiments that after configuring the first DRX parameter for channel monitoring for the terminal, the first power saving signal for indicating the first DRX parameter can be determined first, and then the first power saving signal is sent to the terminal, so that the terminal can determine the corresponding first DRX parameter according to the first power saving signal, and perform the corresponding channel monitoring according to the first DRX parameter, thereby quickly realizing a dynamic configuration of the DRX parameter via the power saving signal and improving the efficiency of channel monitoring.

Figure 3:
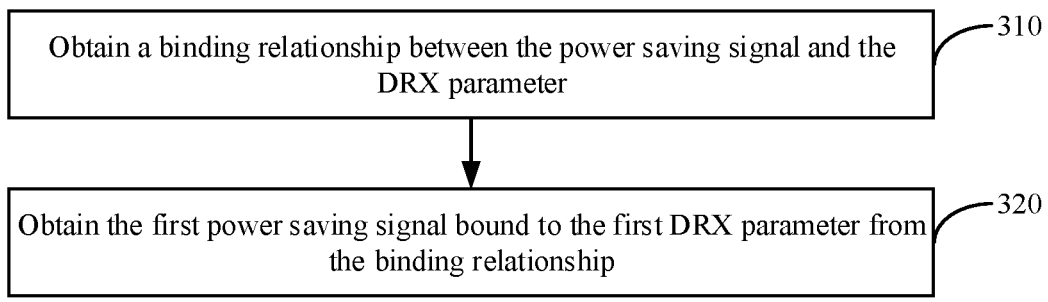
FIG. 3 is another flowchart illustrating a channel monitoring method according to an example.

FIG. 3 is another flowchart illustrating a channel monitoring method according to an example. The channel monitoring method can be applied in a base station and is established on the basis of the method in FIG. 1. When performing step 120, as shown in FIG. 3, the method may include the following steps 310-320.

At step 310, a binding relationship between power saving signal and DRX parameter is obtained.

In the embodiments of the present disclosure, the base station may configure the binding relationship between power saving signal and DRX parameter for the terminal in advance, so that when the base station dynamically configures the first DRX parameter for the terminal, the binding relationship can be used to obtain the first power saving signal indicating the first DRX parameter.

In one or more embodiments, the binding relationship in step 310 may include a one-to-one binding between power saving signal and DRX parameter and/or a many-to-one binding between power saving signal and DRX parameter.

For example: DRX parameter 1 is bound to power saving signal 1, and DRX parameter 2 is bound to power saving signal 2, and DRX parameter 3 is bound to power saving signal 3.

The power saving signal 1-3 may be WUS of different patterns, the different setting of WUS lead to different WUS patterns, for example, different durations of WUS.

In some examples, a DRX parameter may be a set of DRX parameters. For example, the DRX parameter 1 may be consisted of a first set of parameters from (1-1) to (1-5) and DRX parameter 2 may be consisted of a second set of parameters from (1-1) to (1-5). The first and second set of parameters may be partially different or completely different. In some other examples, the DRX parameter may be a partial parameter configuration. For example, a set of parameters containing (1-1), (1-2) and (1-5) may consist the DRX parameter 1 and parameter (1-3) and (1-4) may be obtained from a default DRX parameter configuration.

For another example, the power saving signal bound to DRX parameter 1 includes: power saving signal 1, power saving signal 2, and power saving signal 3.

For another example, the power saving signal bound to DRX parameter 1 is power saving signal 1; and the power saving signal bound to DRX parameter 2 includes: power saving signal 2 and power saving signal 3.

At step 320, the first power saving signal bound to the first DRX parameter is obtained from the binding relationship.

In the embodiment of the present disclosure, if the binding relationship is a one-to-one binding, the first power saving signal bound to the first DRX parameter can be directly obtained from the binding relationship; and if the binding relationship is a many-to-one binding, any one of the power saving signals bound to the first DRX parameter can be directly selected from the binding relationship as the first power saving signal.

It can be seen from the above embodiments that by obtaining the binding relationship between power saving signal and DRX parameter, the first power saving signal bound to the first DRX parameter is obtained from the binding relationship, thereby improving the reliability of determining the first power saving signal for indicating the first DRX parameter.

Figure 4:
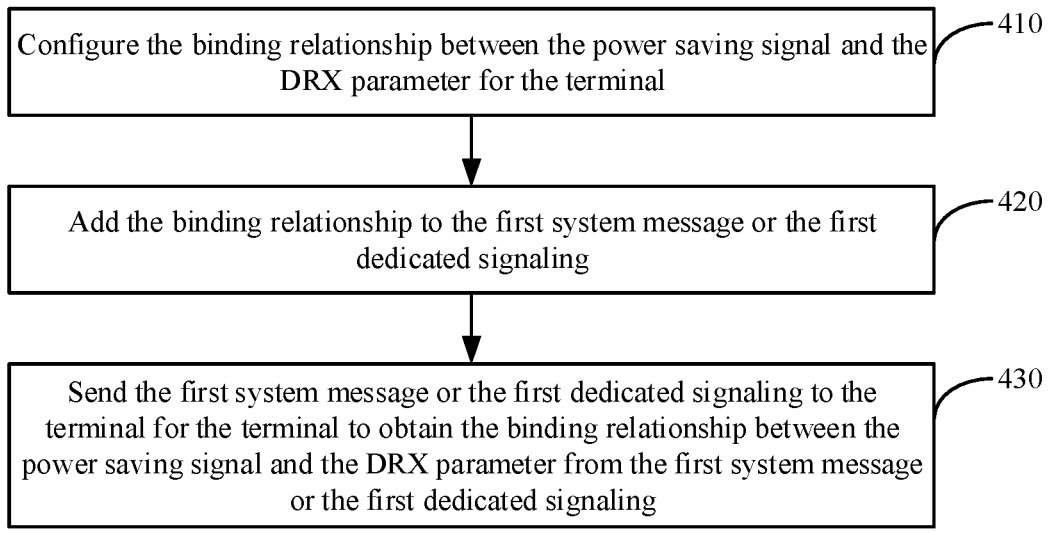
FIG. 4 is another flowchart illustrating a channel monitoring method according to an example.

FIG. 4 is another flowchart illustrating a channel monitoring method according to an example. The channel monitoring method can be applied in a base station and is established on the basis of the method in FIG. 3. As shown in FIG. 4, the method may include the following steps 410-430.

At step 410, the binding relationship between power saving signal and DRX parameter is configured for the terminal.

In the embodiments of the present disclosure, the base station may configure the binding relationship between power saving signal and DRX parameter for the terminal in advance, and inform the terminal of the binding relationship through a first system message or first dedicated signaling.

At step 420, the binding relationship is added to the first system message or the first dedicated signaling.

At step 430, the first system message or the first dedicated signaling is sent to the terminal for the terminal to obtain the binding relationship between power saving signal and DRX parameter from the first system message or the first dedicated signaling.

It can be seen from the above embodiment that the binding relationship between power saving signal and DRX parameter can be configured for the terminal, and the binding relationship can be informed to the terminal through a first system message or first dedicated signaling, which is convenient for the terminal to accurately obtain a DRX parameter corresponding to a received power saving signal from the binding relationship, thereby improving the accuracy of determining the DRX parameter.

Figure 5:
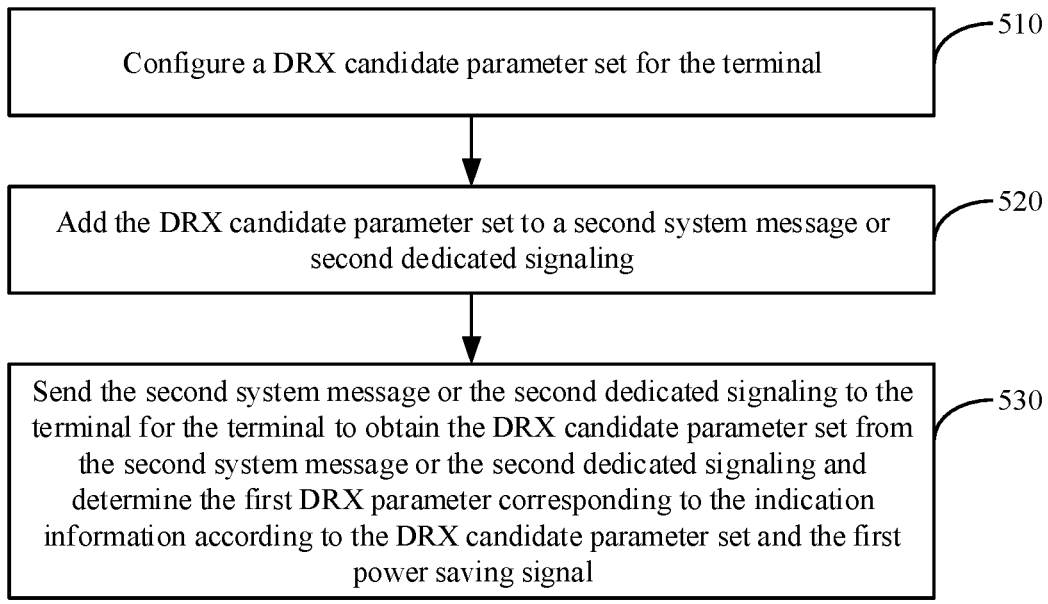
FIG. 5 is another flowchart illustrating a channel monitoring method according to an example.

FIG. 5 is another flowchart illustrating a channel monitoring method according to an example. The channel monitoring method can be applied in a base station and is established on the basis of the method in FIG. 1. In one or more embodiments, the first power saving signal includes the first DRX parameter or indication information for characterizing the first DRX parameter. As shown in FIG. 5, the channel monitoring method may also include the following steps 510 to 530.

At step 510, a DRX candidate parameter set is configured for the terminal.

In the embodiments of the present disclosure, the DRX candidate parameter set may include a plurality of DRX candidate parameters. The base station configures the DRX candidate parameter set in advance and informs the terminal according to the actual situation, so that it is convenient for the terminal to obtain DRX parameters from the DRX candidate parameter set. For example, the first power saving signal includes the indication information for characterizing the first DRX parameter (for example, the indication information indicates "the second one"), so that the terminal can obtain the corresponding first DRX parameter from the DRX candidate parameter set according to the indication information (for example, obtaining the second DRX candidate parameter in the DRX candidate parameter set as the first DRX parameter).

At step 520, the DRX candidate parameter set is added to a second system message or second dedicated signaling.

At step 530, the second system message or the second dedicated signaling is sent to the terminal for the terminal to obtain the DRX candidate parameter set from the second system message or the second dedicated signaling and determine the first DRX parameter corresponding to the indication information according to the DRX candidate parameter set and the first power saving signal.

It can be seen from the above embodiment that the DRX candidate parameter set can be configured for the terminal, and the DRX candidate parameter set can be informed to the terminal through a second system message or second dedicated signaling, which is convenient for the terminal to accurately obtain the DRX parameter corresponding to the indication information in the power saving signal from the DRX candidate parameter set, thereby improving the accuracy of determining the DRX parameter.

Figure 6:
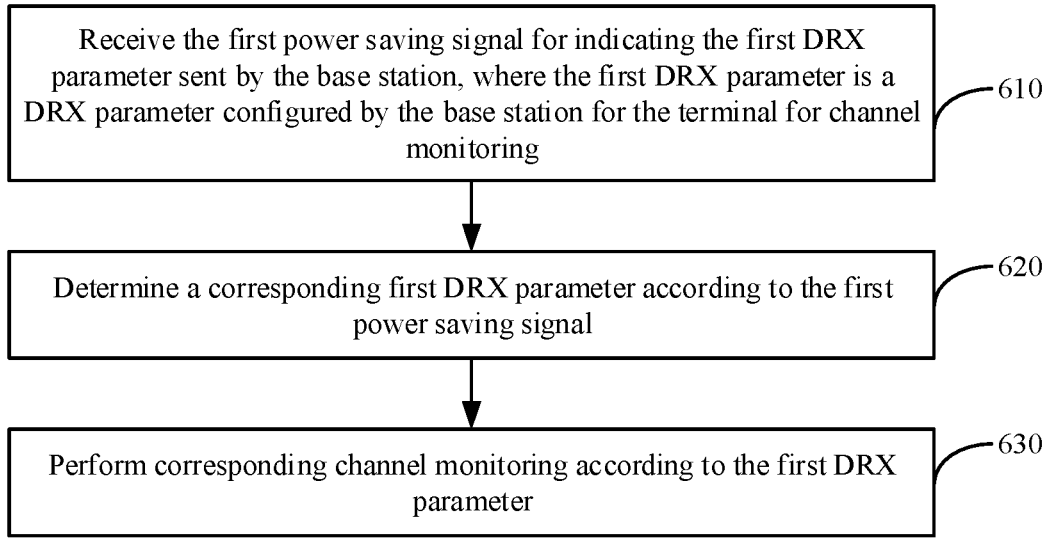
FIG. 6 is a flowchart illustrating a channel monitoring method according to an example.

FIG. 6 is a flowchart illustrating a channel monitoring method according to an example. The channel monitoring method can be applied in a terminal. As shown in FIG. 6, the channel monitoring method may include the following steps 610-630.

At step 610, a first power saving signal for indicating a first DRX parameter sent by a base station is received, where the first DRX parameter is a DRX parameter configured by the base station for the terminal for channel monitoring.

In the embodiments of the present disclosure, due to the base station binds the power saving signal and the DRX parameter, which means that the power saving signal can indicate the corresponding DRX parameter, so that the terminal can use the power saving signal sent by the base station to quickly realize the dynamic configuration of the DRX parameter.

In one embodiment, the first power saving signal for indicating the first DRX parameter may be a WUS or a GTS. WUS is a low-power detection signal. When the terminal detects the WUS, it means that the terminal continues to monitor the PDCCH, otherwise there is no need to monitor the subsequent PDCCH. In addition, the GTS instructs the terminal quickly enter a sleep state.

At step 620, the corresponding first DRX parameter is determined according to the first power saving signal.

At step 630, corresponding channel monitoring is performed according to the first DRX parameter.

It can be seen from the above embodiment that the first power saving signal for indicating the first DRX parameter sent by the base station is received. The first DRX parameter is the DRX parameter configured by the base station for the terminal for channel monitoring, the corresponding first DRX parameter is determined according to the first power saving signal, and corresponding channel monitoring is performed according to the first DRX parameter, thereby quickly realizing a dynamic configuration of the DRX parameter via the power saving signal and improving the efficiency of channel monitoring.

Figure 7:
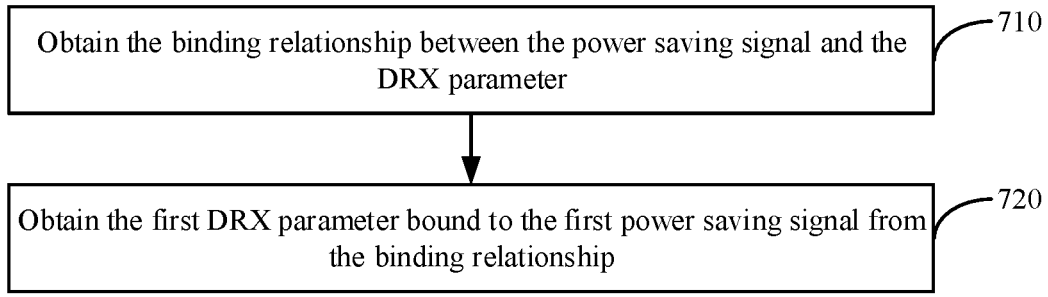
FIG. 7 is another flowchart illustrating a channel monitoring method according to an example.

FIG. 7 is another flowchart illustrating a channel monitoring method according to an example. The channel monitoring method can be applied in a terminal and is established based on the method shown in FIG. 6. When performing step 620, as shown in FIG. 7, the following steps 710-720 may be included.

At step 710, a binding relationship between power saving signal and DRX parameter is obtained.

In the embodiments of the present disclosure, the base station may configure the binding relationship between power saving signal and DRX parameter for the terminal in advance, and inform the terminal through a system message or dedicated signaling, so that the terminal can be obtained the corresponding first DRX parameter directly from the binding relationship configured by the base station when determining the corresponding first DRX parameter based on the first power saving signal.

In one or more embodiments, the binding relationship in step 710 may be a binding relationship between different power saving signals and different DRX parameters configured by the base station for the terminal. The binding relationship includes a one-to-one binding between power saving signal and DRX parameter and/or a many-to-one binding between power saving signal and DRX parameter.

At step 720, the first DRX parameter bound to the first power saving signal is obtained from the binding relationship.

It can be seen from the above embodiments that, a binding relationship between power saving signal and DRX parameter can be obtained, and a first power saving signal bound to the first DRX parameter can be obtained from the binding relationship, thereby improving the reliability of determining the DRX parameter.

Figure 8:
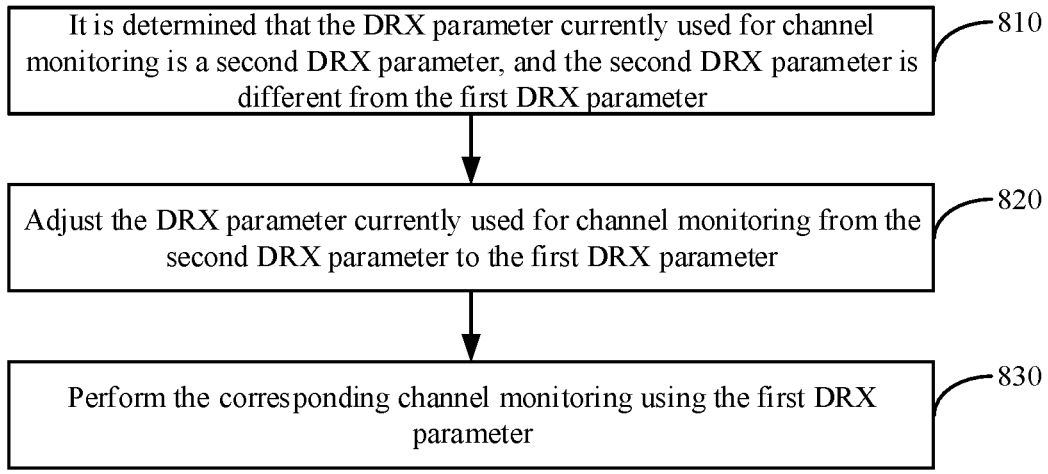
FIG. 8 is another flowchart illustrating a channel monitoring method according to an example.

FIG. 8 is another flowchart illustrating a channel monitoring method according to an example. The channel monitoring method can be applied in a terminal and is established based on the method shown in FIG. 6. When performing step 630, as shown in FIG. 8, the following steps 810-830 may be included.

At step 810, it is determined that a DRX parameter currently used for channel monitoring is a second DRX parameter, and the second DRX parameter is different from the first DRX parameter.

In the embodiments of the present disclosure, after the terminal determines the first DRX parameter indicated by the first power saving signal, if the first DRX parameter is the same as the second DRX parameter currently used for channel monitoring, the second DRX parameter used for the current channel monitoring does not need to be adjusted; and if the first DRX parameter is different from the second DRX parameter currently used for channel monitoring, the DRX parameter currently used for channel monitoring needs to be adjusted.

At step 820, the DRX parameter currently used for channel monitoring is adjusted from the second DRX parameter to the first DRX parameter.

At step 830, the corresponding channel monitoring is performed using the first DRX parameter.

It can be seen from the above embodiment that when it is determined that the DRX parameter currently used for channel monitoring is a second DRX parameter, and the second DRX parameter is different from the first DRX parameter, the DRX parameter currently used for channel monitoring may be adjusted from the second DRX parameter to the first DRX parameter, and the corresponding channel monitoring is performed using the first DRX parameter, thereby realizing a dynamic adjustment on the DRX parameter, and improving the flexibility of channel monitoring.

Figure 9:
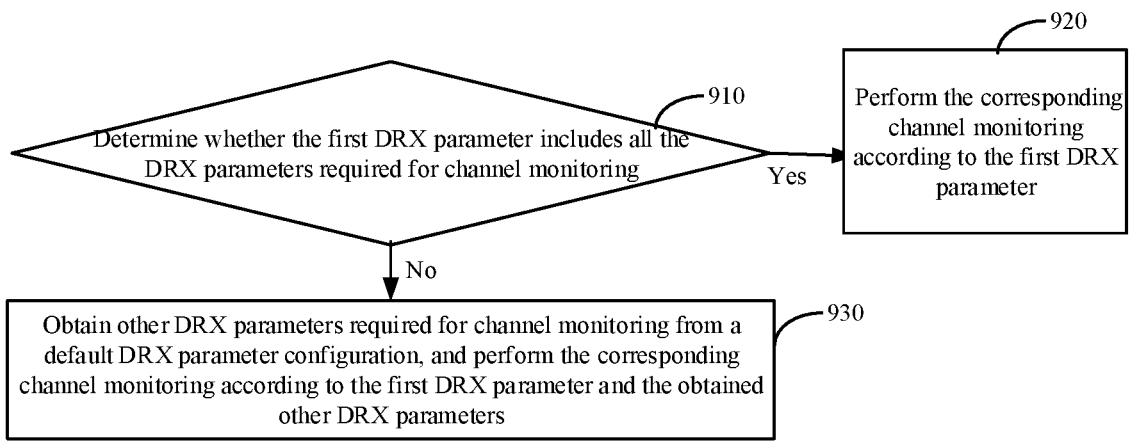
FIG. 9 is another flowchart illustrating a channel monitoring method according to an example.

FIG. 9 is another flowchart illustrating a channel monitoring method according to an example. The channel monitoring method can be applied in a terminal and is established based on the method shown in FIG. 6 or FIG. 8. When performing step 630, as shown in FIG. 9, the following steps 910-930 may be included.

At step 910, it is determined whether the first DRX parameter includes all the DRX parameters required for channel monitoring, if so, step 920 is performed; if not, step 930 is performed.

In the embodiment of the present disclosure, since the first DRX parameter configured by the base station may not include all the DRX parameters required for channel monitoring, for example, the first DRX parameter does not include the short DRX cycle, etc. when the terminal performs channel monitoring using the first DRX parameter, it is necessary to first determine whether the first DRX parameter includes all the DRX parameters required for channel monitoring.

At step 920, the corresponding channel monitoring is performed according to the first DRX parameter.

At step 930, other DRX parameter required for channel monitoring is obtained from a default DRX parameter configuration, and the corresponding channel monitoring is performed according to the first DRX parameter and the obtained other DRX parameter.

In the embodiments of the present disclosure, if the first DRX parameter includes a part of the DRX parameters required for channel monitoring, that is, other DRX parameter required for channel monitoring is missing, the terminal can obtain the other DRX parameter from a default DRX parameter configuration. In this way, the terminal obtains all the DRX parameters required for channel monitoring. For example, if the first DRX parameter does not include the short DRX cycle, the terminal can obtain the short DRX cycle from the default DRX parameter configuration.

In one embodiment, the default DRX parameter configuration in step 930 may be a default parameter configured by the base station for the terminal and informed to the terminal through a system message or dedicated signaling.

It can be seen from the above embodiments that if it is determined that the first DRX parameter includes all the DRX parameters required for channel monitoring, the corresponding channel monitoring can be performed according to the first DRX parameter; and if it is determined that the first DRX parameter includes a part of the required DRX parameters for channel monitoring, other DRX parameters required for channel monitoring can be obtained from a default DRX parameter configuration, and the corresponding channel monitoring can be performed according to the first DRX parameter and the obtained other DRX parameters, thereby improving the reliability of channel monitoring.

Figure 10:
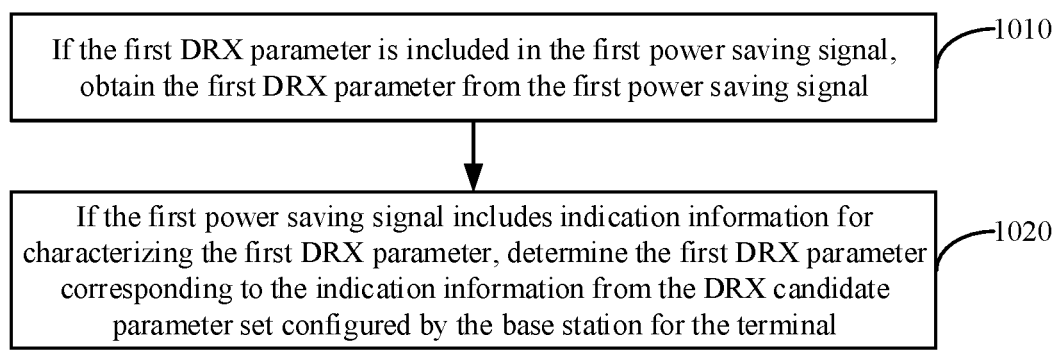
FIG. 10 is another flowchart illustrating a channel monitoring method according to an example.

FIG. 10 is another flowchart illustrating a channel monitoring method according to an example. The channel monitoring method can be applied in a terminal and is established based on the method shown in FIG. 6. The first power saving signal includes the first DRX parameter or indication information for characterizing the first DRX parameter. When performing step 620, as shown in FIG. 10, the following steps 1010-1020 may be included.

At step 1010, if the first DRX parameter is included in the first power saving signal, the first DRX parameter is obtained from the first power saving signal.

In the embodiments of the present disclosure, regardless of whether the base station configures the binding relationship between the power saving signal and the DRX parameter for the terminal, as long as the first power saving signal includes the first DRX parameter, the first DRX parameter is preferentially obtained from the first power saving signal.

At step 1020, if the first power saving signal includes indication information for characterizing the first DRX parameter, the first DRX parameter corresponding to the indication information is determined from a DRX candidate parameter set configured by the base station for the terminal.

In the embodiments of the present disclosure, if the base station configures the DRX candidate parameter set for the terminal, the first DRX parameter corresponding to the indication information in the first power saving signal can be determined from the DRX candidate parameter set. For example, if the indication information indicates "the second one", the terminal may obtain the second DRX candidate parameter in the DRX candidate parameter set as the first DRX parameter according to the indication information.

It can be seen from the above embodiment that when determining the corresponding first DRX parameter according to the first power saving signal, if the first DRX parameter is included in the first power saving signal, the first DRX parameter is obtained from the first power saving signal; and if the first power saving signal includes the indication information for characterizing the first DRX parameter, the first DRX parameter corresponding to the indication information can also be determined from the DRX candidate parameter set configured by the base station for the terminal, thereby improving the accuracy of determining the DRX parameter.

Corresponding to the foregoing examples of the channel monitoring methods, the present disclosure also provides examples of channel monitoring apparatuses. In addition, for the parts that are not described in detail in the embodiments of the channel monitoring apparatuses, it can be referred to the embodiments of the corresponding channel monitoring methods.

Figure 11:
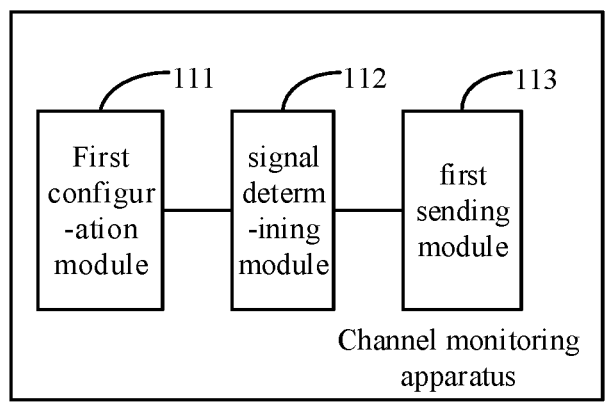
FIG. 11 is a block diagram illustrating a channel monitoring apparatus according to an example.

FIG. 11 is a block diagram illustrating a channel monitoring apparatus according to an example. The channel monitoring apparatus can be applied in a terminal, and is configured to perform the channel monitoring method shown in FIG. 1. As shown in FIG. 11, the channel monitoring apparatus may include:
 a first configuration module 111, configured to configure a first discontinuous reception (DRX) parameter for a terminal for channel monitoring;
 a signal determining module 112, configured to determine a first power saving signal for indicating the first DRX parameter;
 a first sending module 113, configured to send the first power saving signal to the terminal for the terminal to determine the corresponding first DRX parameter based on the first power saving signal and perform corresponding channel monitoring based on the first DRX parameter.

It can be seen from the above embodiments that after configuring the first DRX parameter for channel monitoring for the terminal, the first power saving signal for indicating the first DRX parameter can be determined first, and then the first power saving signal is sent to the terminal, so that the terminal can determine the corresponding first DRX parameter according to the first power saving signal, and perform the corresponding channel monitoring according to the first DRX parameter, thereby quickly realizing a dynamic configuration of the DRX parameter and improving the efficiency of channel monitoring.

In one or more embodiments, based on the apparatus shown FIG. 11, the first DRX parameter includes at least one of the following parameters:
- a DRX wake-up duration configured for monitoring a physical downlink control channel (PDCCH) and/or monitoring a physical downlink shared channel (PDSCH);
- a DRX inactivity timer configured to delay the DRX wake-up duration;
- a short DRX cycle;
- a long DRX cycle;
- a DRX short cycle timer configured to enter the long DRX cycle after the DRX short cycle timer expires.

Figure 12:
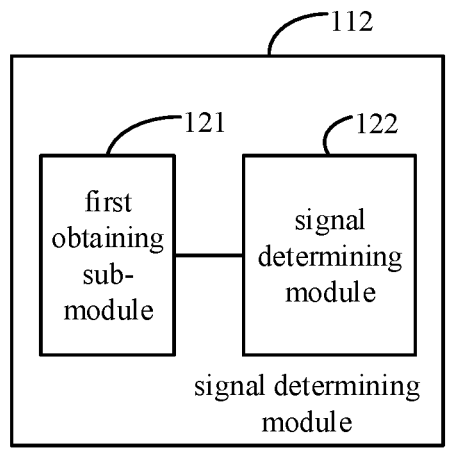
FIG. 12 is another block diagram illustrating a channel monitoring apparatus according to an example.

In one or more embodiments, based on the apparatus shown FIG. 11, as shown in FIG. 12, the signal determining module 112 may include:
- a first obtaining sub-module 121, configured to obtain a binding relationship between the power saving signal and the DRX parameter;
- a signal determining module 122, configured to obtain the first power saving signal bound to the first DRX parameter from the binding relationship.

It can be seen from the above embodiments that by obtaining the binding relationship between the power saving signal and the DRX parameter, and obtaining the first power saving signal bound to the first DRX parameter from the binding relationship, the reliability of determining the first power saving signal for indicating the first DRX parameter is improved.

In one or more embodiments, based on the apparatus shown in FIG. 12, the binding relationship includes: a one-to-one binding between power saving signal and DRX parameter and/or a many-to-one binding between power saving signal and DRX parameter.

Figure 13:
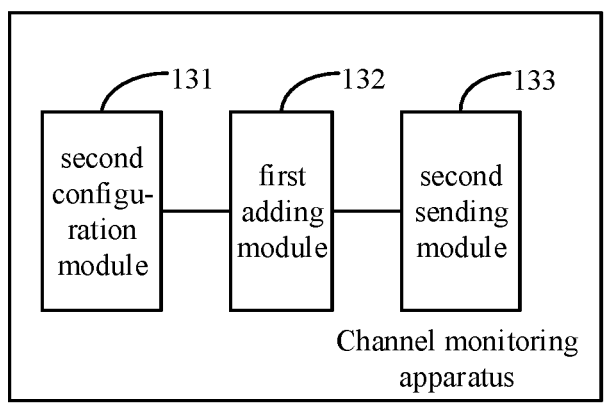
FIG. 13 is another block diagram illustrating a channel monitoring apparatus according to an example.

In one or more embodiments, based on the apparatus shown in FIG. 12, as shown in FIG. 13, the apparatus may further include:
- a second configuration module 131, configured to configure the binding relationship for the terminal;
- a first adding module 132, configured to add the binding relationship to a first system message or first dedicated signaling;
- a second sending module 133, configured to send the first system message or the first dedicated signaling to the terminal for the terminal to obtain the binding relationship from the first system message or the first dedicated signaling.

It can be seen from the above embodiment that the binding relationship between the power saving signal and the DRX parameter can be configured for the terminal, and the binding relationship can be informed to the terminal through a first system message or first dedicated signaling, which is convenient for the terminal to accurately obtain the DRX parameter corresponding to the received power saving signal from the binding relationship, thereby improving the accuracy of determining the DRX parameter.

In one or more embodiments, based on the apparatus shown in FIG. 11, the first power saving signal includes the first DRX parameter or indication information for characterizing the first DRX parameter.

Figure 14:
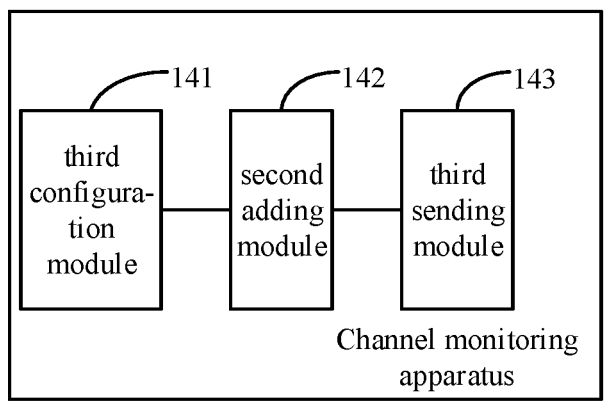
FIG. 14 is another block diagram illustrating a channel monitoring apparatus according to an example.

In one or more embodiments, based on the apparatus shown in FIG. 11, the first power saving signal includes the first DRX parameter or indication information for characterizing the first DRX parameter, as shown in FIG. 14, the apparatus may further include:
- a third configuration module 141, configured to configure a DRX candidate parameter set for the terminal;
- a second adding module 142, configured to add the DRX candidate parameter set to a second system message or second dedicated signaling;
- a third sending module 143, configured to send the second system message or the second dedicated signaling to the terminal for the terminal to obtain the DRX candidate parameter set from the second system message or the second dedicated signaling and determine the first DRX parameter corresponding to the indication information based on the DRX candidate parameter set and the first power saving signal.

It can be seen from the above embodiment that the DRX candidate parameter set can be configured for the terminal, and the DRX candidate parameter set can be informed to the terminal through a second system message or second dedicated signaling, which is convenient for the terminal to accurately obtain the DRX parameter corresponding to the indication information in the power saving signal from the DRX candidate parameter set, thereby improving the accuracy of determining the DRX parameter.

In one or more embodiments, based on the apparatus shown in FIG. 11, the first power saving signal is a wake-up signal (WUS) or a go to sleep signal (GTS).

Figure 15:
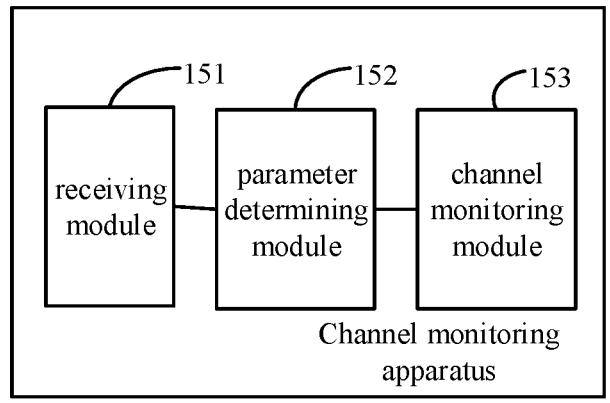
FIG. 15 is a block diagram illustrating a channel monitoring apparatus according to an example.

FIG. 15 is a block diagram illustrating a channel monitoring apparatus according to an example. The channel monitoring apparatus can be applied in a base station, and is configured to perform the channel monitoring method shown in FIG. 6. As shown in FIG. 15, the channel monitoring apparatus may include:
- a receiving module 151, configured to receive a first power saving signal for indicating a first DRX parameter sent by a base station, wherein the first DRX parameter is a DRX parameter configured by the base station for the terminal for channel monitoring;
- a parameter determining module 152, configured to determine the corresponding first DRX parameter based on the first power saving signal;
- a channel monitoring module 153, configured to perform corresponding channel monitoring based on the first DRX parameter.

It can be seen from the above embodiment that the first power saving signal for indicating the first DRX parameter sent by the base station is received. The first DRX parameter is the DRX parameter configured by the base station for the terminal for channel monitoring, a corresponding first DRX parameter is determined according to the first power saving signal, and corresponding channel monitoring is performed according to the first DRX parameter, thereby quickly realizing a dynamic configuration of the DRX parameter via the power saving signal and improving the efficiency of channel monitoring.

Figure 16:
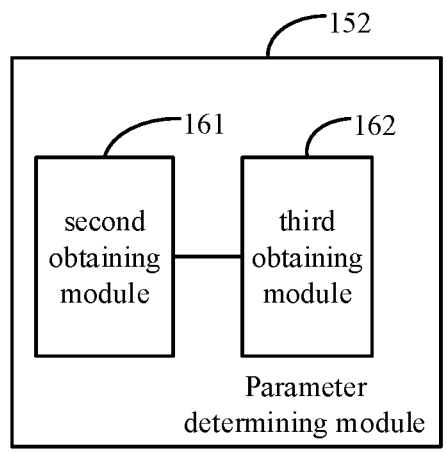
FIG. 16 is another block diagram illustrating a channel monitoring apparatus according to an example.

In one or more embodiments, based on the apparatus shown in FIG. 15, as shown in FIG. 16, the parameter determining module 152 may include:
- a second obtaining module 161, configured to obtain a binding relationship between the power saving signal and the DRX parameter; and
- a third obtaining module 162, configured to obtain the first DRX parameter bound to the first power saving signal from the binding relationship.

It can be seen from the above embodiments that, a binding relationship between the power saving signal and the DRX parameter can be obtained, and a first power saving signal bound to the first DRX parameter can be obtained from the binding relationship, thereby improving the reliability of determining the DRX parameter.

In one or more embodiments, based on the apparatus shown in FIG. 16, the binding relationship includes: a one-to-one binding between power saving signal and DRX parameter and/or a many-to-one binding between power saving signal and DRX parameter.

Figure 17:
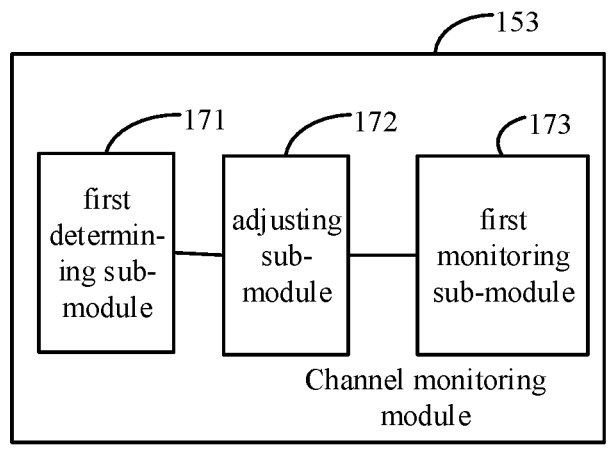
FIG. 17 is another block diagram illustrating a channel monitoring apparatus according to an example.

In one or more embodiments, based on the apparatus shown in FIG. 15, as shown in FIG. 17, the channel monitoring module 153 may include:
- a first determining sub-module 171, configured to determine that the DRX parameter currently used for channel monitoring is a second DRX parameter, and the second DRX parameter is different from the first DRX parameter;
- an adjusting sub-module 172, configured to adjust the DRX parameter currently used for channel monitoring from the second DRX parameter to the first DRX parameter;
- a first monitoring sub-module 173, configured to use the first DRX parameter to perform the corresponding channel monitoring.

It can be seen from the above embodiment that when it is determined that the DRX parameter currently used for channel monitoring is a second DRX parameter, and the second DRX parameter is different from the first DRX parameter, the DRX parameter currently used for channel monitoring may be adjusted from the second DRX parameter to the first DRX parameter, and the corresponding channel monitoring is performed using the first DRX parameter, thereby realizing a dynamic adjustment on the DRX parameter, and improving the flexibility of channel monitoring.

Figure 18:
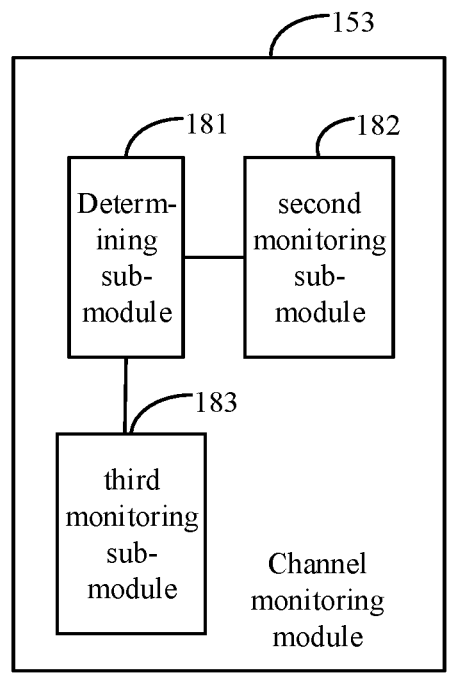
FIG. 18 is another block diagram illustrating a channel monitoring apparatus according to an example.

In one or more embodiments, based on the apparatus shown in FIG. 15 or FIG. 17, as shown in FIG. 18, the channel monitoring module 153 may include:
- a determining sub-module 181, configured to determine whether the first DRX parameter includes all DRX parameters required for channel monitoring;
- a second monitoring sub-module 182, configured to, if it is determined that the first DRX parameter includes all the DRX parameters required for channel monitoring, perform the corresponding channel monitoring based on the first DRX parameter;
- a third monitoring sub-module 183, configured to, if it is determined that the first DRX parameter includes a part of the DRX parameters required for channel monitoring, obtain other DRX parameters required for channel monitoring from a default DRX parameter configuration, and perform the corresponding channel monitoring based on the first DRX parameter and the other DRX parameters.

It can be seen from the above embodiments that if it is determined that the first DRX parameter includes all the DRX parameters required for channel monitoring, the corresponding channel monitoring can be performed according to the first DRX parameter; if it is determined that the first DRX parameter includes a part of the required DRX parameters for channel monitoring, other DRX parameters required for channel monitoring can be obtained from a default DRX parameter configuration, and the corresponding channel monitoring can be performed according to the first DRX parameter and the obtained other DRX parameters, thereby improving the reliability of channel monitoring.

In one or more embodiments, based on the apparatus shown in FIG. 18, the default DRX parameter configuration is a default parameter configured by the base station for the terminal and informed to the terminal through a system message or dedicated signaling.

Figure 19:
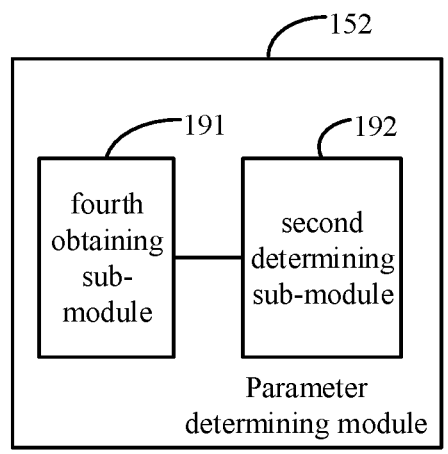
FIG. 19 is another block diagram illustrating a channel monitoring apparatus according to an example.

In one or more embodiments, based on the apparatus shown in FIG. 15, as shown in FIG. 19, the first power saving signal includes the first DRX parameter or indication information for characterizing the first DRX parameter; and the parameter determining module 152 may include:
- a fourth obtaining sub-module 191, configured to, in response to that the first power saving signal includes the first DRX parameter, obtain the first DRX parameter from the first power saving signal;
- a second determining sub-module 192, configured to, in response to that the first power saving signal includes the indication information for characterizing the first DRX parameter, determine the first DRX parameter corresponding to the indication information from the DRX candidate parameter set configured by the base station for the terminal.

It can be seen from the above embodiment that when determining the corresponding first DRX parameter according to the first power saving signal, if the first DRX parameter is included in the first power saving signal, the first DRX parameter is preferentially obtained from the first power saving signal; if the first power saving signal includes the indication information for characterizing the first DRX parameter, the first DRX parameter corresponding to the indication information can also be determined from the DRX candidate parameter set configured by the base station for the terminal, thereby improving the accuracy of determining the DRX parameter.

For the device examples, since they basically correspond to the method examples, reference may be made to the partial description of the method examples. The device examples described above are merely illustrative, wherein the units described as separate components may or may not be physically separated, and the components displayed as units may or may not be physical units, i.e., may be located in one place or may be distributed to multiple network units. Some or all of the modules may be selected according to actual needs to achieve the objectives of the present disclosure. One of ordinary skill in the art can understand and implement the present disclosure without creative work.

The present disclosure further provides a non-transitory computer-readable storage medium on which a computer program is stored, and the computer program is configured to perform the channel monitoring described in any one of FIGS. 1 to 5.

The present disclosure further provides a non-transitory computer-readable storage medium on which a computer program is stored, and the computer program is configured to perform the channel monitoring described in any one of FIGS. 6 to 10.

Correspondingly, the present disclosure also provides a channel monitoring apparatus, which is applicable to a base station, and the apparatus includes: a processor; a memory storing processor-executable instructions. The processor is configured to: configure a first discontinuous reception (DRX) parameter for a terminal for channel monitoring; determine a first power saving signal for indicating the first DRX parameter; and send the first power saving signal to the terminal for the terminal to determine the corresponding first DRX parameter based on the first power saving signal and perform corresponding channel monitoring based on the first DRX parameter.

Figure 20:
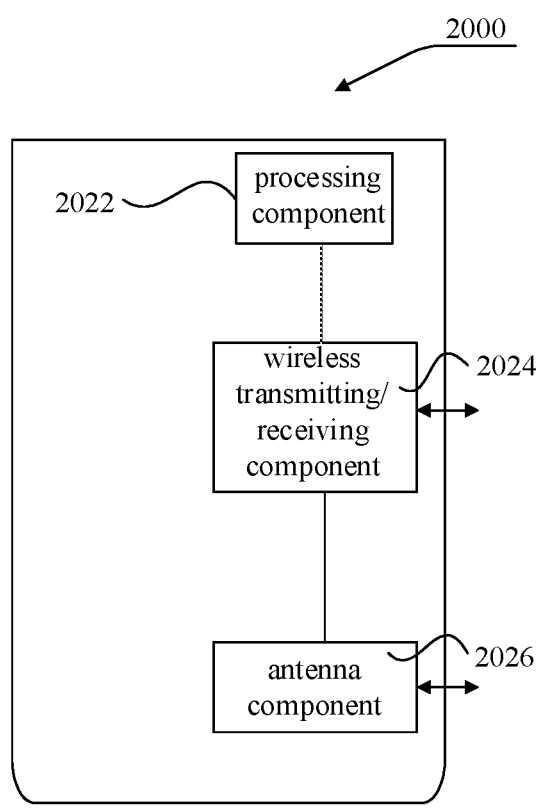
FIG. 20 is a schematic structural diagram illustrating a channel monitoring apparatus according to an example.

FIG. 20 is a schematic structural diagram illustrating an apparatus for channel monitoring according to an example. The apparatus 2000 can be a base station. Referring to FIG. 20, the device 2000 includes a processing component 2022, a wireless transmitting/receiving component 2024, an antenna component 2026, and a signal processing portion specific to a wireless interface. The processing component 2022 may further include one or more processors.

One of the processors in the processing component 2022 may be configured to execute any one of the foregoing channel monitoring methods.

Correspondingly, the present disclosure provides a channel monitoring apparatus, which is applied to a terminal, and includes: a processor; and a memory storing processor-executable instructions. The processor is configured to: receive a first power saving signal for indicating a first DRX parameter sent by a base station, wherein the first DRX parameter is a DRX parameter configured by the base station for the terminal for channel monitoring; determine the corresponding first DRX parameter based on the first power saving signal; perform corresponding channel monitoring based on the first DRX parameter.

Figure 21:
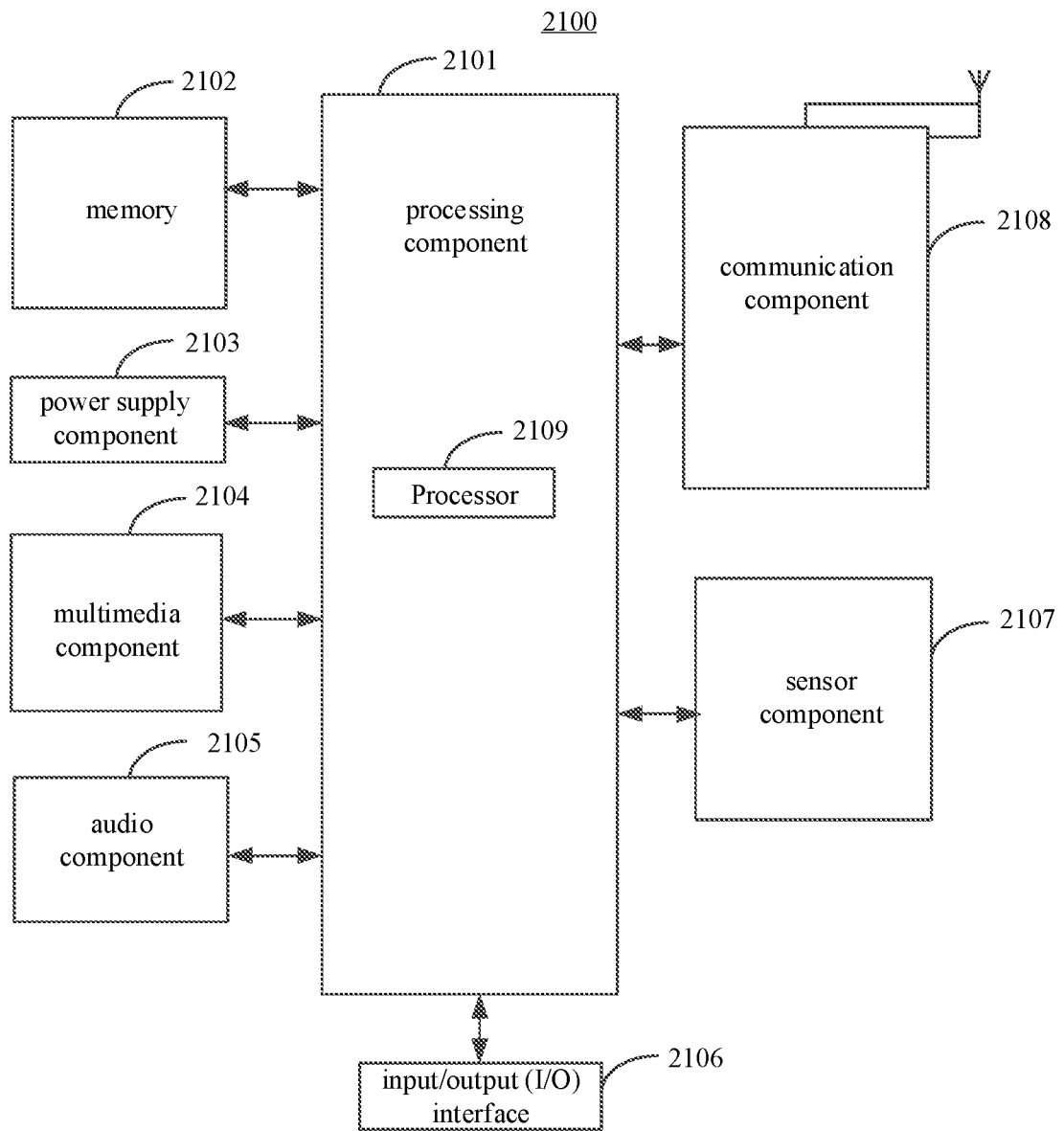
FIG. 21 is a schematic structural diagram illustrating a channel monitoring apparatus according to an example.

FIG. 21 is a schematic structural diagram illustrating a channel monitoring apparatus according to an example. As shown in FIG. 21, a channel monitoring apparatus 2100 is shown according to an example. The apparatus 2100 may be a computer, a mobile phone, a digital broadcast terminal, a messaging device, a game console, a tablet device, a medical equipment, a fitness equipment, a personal digital assistant, or other terminals.

As shown in FIG. 21, the apparatus 2100 can include one or more of the following components: a processing component 2101, a memory 2102, a power supply component 2103, a multimedia component 2104, an audio component 2105, an input/output (I/O) interface 2106, a sensor component 2107, and a communication component 2108.

The processing component 2101 generally controls the overall operations of the apparatus 2100, such as operations associated with display, telephone call, data communication, camera operation, and recording operation. The processing component 2101 can include one or more processors 2109 to execute instructions to complete all or part of the steps of the above methods. Moreover, the processing component 2101 may include one or more modules to facilitate interaction between the processing component 2101 and other components. For example, the processing component 2101 can include a multimedia module to facilitate the interaction between the multimedia component 2104 and the processing component 2101.

The memory 2102 is configured to store various types of data to support the operation of the apparatus 2100. Examples of the data include instructions for any application or method operated on the apparatus 2100, contact data, phone book data, messages, pictures, videos, and etc. The memory 2102 can be implemented by any type of volatile or non-volatile storage devices or their combination, such as a static random access memory (SRAM), an electrically erasable programmable read-only memory (EEPROM), erasable Programmable read only memory (EPROM), a programmable read only memory (PROM), a read only memory (ROM), a magnetic memory, a flash memory, a magnetic or optical disk.

The power supply component 2103 supplies power for different components of the apparatus 2100. The power component 2103 may include a power management system, one or more power sources, and other components associated with power generated, managed, and distributed for the apparatus 2100.

The multimedia component 2104 includes a screen providing an output interface between the apparatus 2100 and a user. In some embodiments, the screen may include a liquid crystal display (LCD) and a touch panel (TP). When the screen includes a touch panel, the screen may be implemented as a touch screen to receive input signals from the user. The TP can include one or more touch sensors to sense touches, swipes, and gestures on the TP. The touch sensors may not only sense a boundary of a touch or swipe, but also sense a lasting time and a pressure associated with the touch or swipe. In some embodiments, the multimedia component 2104 includes a front camera and/or a rear camera. The front camera and/or rear camera may receive external multimedia data when the apparatus 2100 is in an operating mode, such as a photographing mode or a video mode. Each of the front camera and the rear camera can be a fixed optical lens system or have focal length and optical zooming capability.

The audio component 1616 is configured to output and/or input an audio signal. For example, the audio component 2105 includes a microphone (MIC). When the apparatus 2100 is in an operation mode, such as a call mode, a recording mode, and a voice recognition mode, the microphone is configured to receive external audio signals. The received audio signal may be further stored in the memory 2102 or transmitted via the communication component 2608. In some examples, the audio component 2105 further includes a speaker for outputting an audio signal.

The I/O interface 2106 provides an interface between the processing component 2101 and a peripheral interface module which may be a keyboard, a click wheel, a button, or the like. These buttons may include but are not limited to: home button, volume button, start button, and lock button.

The sensor component 2107 includes one or more sensors for providing the apparatus 2100 with status assessment in various aspects. For example, the sensor component 2107 may detect an open/closed state of the apparatus 2100 and a relative positioning of components such as the display and keypad of the apparatus 2100, and the sensor component 2107 can also detect a change in position of the apparatus 2100 or a component of the apparatus 2100, the presence or absence of user contact with the apparatus 2100, orientation or acceleration/deceleration of the apparatus 2100, and temperature change of the apparatus 2100. The sensor assembly 2107 may include a proximity sensor configured to detect presence of nearby objects without physical contact. The sensor component 2107 may further include an optical sensor, such as a CMOS or CCD image sensor, for imaging applications. In some examples, the sensor component 2107 can further include an acceleration sensor, a gyroscope sensor, a magnetic sensor, a pressure sensor, or a temperature sensor.

The communication component 2108 is configured to facilitate wired or wireless communication between the apparatus 2100 and other devices. The apparatus 2100 can access a wireless network based on a communication standard, such as WiFi, 2G or 3G, or a combination thereof. In an example, the communication component 2108 receives a broadcast signal or broadcast related information from an external broadcast management system via a broadcast channel. In one or more embodiments, the communication component 2108 also includes a near field communication (NFC) module to facilitate short-range communication. For example, the NFC module may be implemented based on a radio frequency identification (RFID) technology, an infrared data association (IrDA) technology, an ultra wide band (UWB) technology, a Bluetooth (BT) technology, and other technologies.

In an example, the apparatus 2100 may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic elements for performing the above methods.

In an exemplary embodiment of the present disclosure, there is further provided a non-transitory computer-readable storage medium having instructions, such as the memory 2102 having instructions, which can be executed by the processor 2109 of the apparatus 2100 to complete the foregoing methods. For example, the non-transitory computer-readable storage medium can be a ROM, a random access memory (RAM), a CD-ROM, a magnetic tape, a floppy disk, an optical data storage device, or the like.

When the instructions in the storage medium are executed by the processor, the apparatus 2100 is configured for executing any of the above-described channel monitoring methods.

Optionally, the first DRX parameter includes at least one of the following parameters:
 a DRX wake-up duration configured for monitoring a physical downlink control channel (PDCCH) and/or monitoring a physical downlink shared channel (PDSCH);
 a DRX inactivity timer configured to delay the DRX wake-up duration;
 a short DRX cycle;
 a long DRX cycle;
 a DRX short cycle timer configured to enter the long DRX cycle after the DRX short cycle timer expires.

Optionally, determining a first power saving signal for indicating the first DRX parameter includes:
 obtain a binding relationship between power saving signal and DRX parameter;
 obtaining the first power saving signal bound to the first DRX parameter from the binding relationship.

Optionally, the binding relationship includes: a one-to-one binding between power saving signal and DRX parameter and/or a many-to-one binding between power saving signal and DRX parameter.

Optionally, the method further includes:
 configuring the binding relationship for the terminal;
 adding the binding relationship to a first system message or first dedicated signaling;
 sending the first system message or the first dedicated signaling to the terminal for the terminal to obtain the binding relationship from the first system message or the first dedicated signaling.

Optionally, the first power saving signal includes the first DRX parameter or indication information for characterizing the first DRX parameter.

Optionally, the method further includes:
 configuring a DRX candidate parameter set for the terminal;
 adding the DRX candidate parameter set to a second system message or second dedicated signaling;
 sending the second system message or the second dedicated signaling to the terminal for the terminal to obtain the DRX candidate parameter set from the second system message or the second dedicated signaling and determine the first DRX parameter corresponding to the indication information based on the DRX candidate parameter set and the first power saving signal.

Optionally, the first power saving signal is a wake-up signal (WUS) or a go to sleep signal (GTS).

According to a second aspect of examples of the present disclosure, a channel monitoring method is provided, which is applied to a terminal and includes:
 receiving a first power saving signal for indicating a first DRX parameter sent by a base station, wherein the first DRX parameter is a DRX parameter configured by the base station for the terminal for channel monitoring;
 determining the corresponding first DRX parameter based on the first power saving signal;
 performing corresponding channel monitoring based on the first DRX parameter.

Optionally, determining the corresponding first DRX parameter based on the first power saving signal includes:
 obtaining a binding relationship between the power saving signal and the DRX parameter;
 obtaining the first DRX parameter bound to the first power saving signal from the binding relationship.

Optionally, the binding relationship is a binding relationship between different power saving signals and different DRX parameters configured by the base station for the terminal, and the binding relationship includes a one-to-one binding between power saving signal and DRX parameter and/or a many-to-one binding between power saving signal and DRX parameter.

Optionally, performing the corresponding channel monitoring based on the first DRX parameter includes:
 determining that the DRX parameter currently used for channel monitoring is a second DRX parameter, and the second DRX parameter is different from the first DRX parameter;
 adjusting the DRX parameter currently used for channel monitoring from the second DRX parameter to the first DRX parameter;
 using the first DRX parameter to perform the corresponding channel monitoring.

Optionally, wherein performing the corresponding channel monitoring based on the first DRX parameter includes:
 determining whether the first DRX parameter includes all DRX parameters required for channel monitoring;
 in response to determining that the first DRX parameter includes all the DRX parameters required for channel monitoring, performing the corresponding channel monitoring based on the first DRX parameter;
 in response to determining that the first DRX parameter includes a part of the DRX parameters required for channel monitoring, obtaining other DRX parameters required for channel monitoring from a default DRX parameter configuration, and performing the corresponding channel monitoring based on the first DRX parameter and the other DRX parameters.

Optionally, the default DRX parameter configuration is a default parameter configured by the base station for the terminal and informed to the terminal through a system message or dedicated signaling.

Optionally, the first power saving signal includes the first DRX parameter or indication information for characterizing the first DRX parameter;
 determining the first DRX parameter based on the first power saving signal includes:
 in response to that the first power saving signal includes the first DRX parameter, obtaining the first DRX parameter from the first power saving signal;

in response to that the first power saving signal includes the indication information for characterizing the first DRX parameter, determining the first DRX parameter corresponding to the indication information from the DRX candidate parameter set configured by the base station for the terminal.

Optionally, the first DRX parameter includes at least one of the following parameters:
a DRX wake-up duration configured for monitoring a physical downlink control channel (PDCCH) and/or monitoring a physical downlink shared channel (PDSCH);
a DRX inactivity timer configured to delay the DRX wake-up duration;
a short DRX cycle;
a long DRX cycle;
a DRX short cycle timer configured to enter the long DRX cycle after the DRX short cycle timer expires.

Optionally, the signal determining module includes:
a first obtaining sub-module, configured to obtain a binding relationship between power saving signal and DRX parameter;
a signal determining module, configured to obtain the first power saving signal bound to the first DRX parameter from the binding relationship.

Optionally, the binding relationship includes: a one-to-one binding between power saving signal and DRX parameter and/or a many-to-one binding between power saving signal and DRX parameter.

Optionally, the apparatus further includes:
a second configuration module, configured to configure the binding relationship for the terminal;
a first adding module, configured to add the binding relationship to a first system message or first dedicated signaling;
a second sending module, configured to send the first system message or the first dedicated signaling to the terminal for the terminal to obtain the binding relationship from the first system message or the first dedicated signaling.

Optionally, the first power saving signal includes the first DRX parameter or indication information for characterizing the first DRX parameter.

Optionally, the apparatus further includes:
a third configuration module, configured to configure a DRX candidate parameter set for the terminal;
a second adding module, configured to add the DRX candidate parameter set to a second system message or second dedicated signaling;
a third sending module, configured to send the second system message or the second dedicated signaling to the terminal for the terminal to obtain the DRX candidate parameter set from the second system message or the second dedicated signaling and determine the first DRX parameter corresponding to the indication information based on the DRX candidate parameter set and the first power saving signal.

Optionally, the first power saving signal is a wake-up signal (WUS) or a go to sleep signal (GTS).

According to a fourth aspect of examples of the present disclosure, a channel monitoring apparatus is provided, which is applied to a terminal and includes:
a receiving module, configured to receive a first power saving signal for indicating a first DRX parameter sent by a base station, wherein the first DRX parameter is a DRX parameter configured by the base station for the terminal for channel monitoring;
a parameter determining module, configured to determine the first DRX parameter based on the first power saving signal;
a channel monitoring module, configured to perform a corresponding channel monitoring based on the first DRX parameter.

Optionally, the parameter determining includes:
a second obtaining module, configured to obtain a binding relationship between power saving signal and DRX parameter; and
a third obtaining module, configured to obtain the first DRX parameter bound to the first power saving signal from the binding relationship.

Optionally, the binding relationship is a binding relationship between different power saving signals and different DRX parameters configured by the base station for the terminal, and the binding relationship includes a one-to-one binding between power saving signal and DRX parameter and/or a many-to-one binding between power saving signal and DRX parameter.

Optionally, the channel monitoring module includes:
a first determining sub-module, configured to determine that the DRX parameter currently used for channel monitoring is a second DRX parameter, and the second DRX parameter is different from the first DRX parameter;
an adjusting sub-module, configured to adjust the DRX parameter currently used for channel monitoring from the second DRX parameter to the first DRX parameter;
a first monitoring sub-module, configured to use the first DRX parameter to perform the corresponding channel monitoring.

Optionally, the channel monitoring module includes:
a determining sub-module, configured to determine whether the first DRX parameter includes all DRX parameters required for channel monitoring;
a second monitoring sub-module, configured to, in response to determining that the first DRX parameter includes all the DRX parameters required for channel monitoring, perform the corresponding channel monitoring based on the first DRX parameter;
a third monitoring sub-module, configured to, in response to determining that the first DRX parameter includes a part of the DRX parameters required for channel monitoring, obtain other DRX parameters required for channel monitoring from a default DRX parameter configuration, and perform the corresponding channel monitoring based on the first DRX parameter and the other DRX parameters.

Optionally, the default DRX parameter configuration is a default parameter configured by the base station for the terminal and informed to the terminal through a system message or dedicated signaling.

Optionally, the first power saving signal includes the first DRX parameter or indication information for characterizing the first DRX parameter; and the parameter determining module includes:
a fourth obtaining sub-module, configured to, in response to that the first power saving signal includes the first DRX parameter, obtain the first DRX parameter from the first power saving signal;
a second determining sub-module, configured to, in response to that the first power saving signal includes the indication information for characterizing the first DRX parameter, determine the first DRX parameter corresponding to the indication information from the DRX candidate parameter set configured by the base station for the terminal.

The technical solutions provided by the embodiments of the present disclosure may produce the following beneficial effects. It can be seen from the above embodiments that after configuring the first DRX parameter for channel monitoring for the terminal, the first power saving signal for indicating the first DRX parameter can be determined first, and then the first power saving signal is sent to the terminal, so that the terminal can determine the corresponding first DRX parameter according to the first power saving signal and perform the corresponding channel monitoring according to the first DRX parameter, thereby quickly realizing a dynamic configuration of the DRX parameter via the power saving signal and improving the efficiency of channel monitoring.

The terminal in this disclosure can quickly realize the dynamic configuration of the DRX parameter by receiving a first power saving signal for indicating the first DRX parameter sent by a base station, where the first DRX parameter is the DRX parameter configured by the base station for the terminal for channel monitoring, determining a corresponding first DRX parameter according to the first power saving signal, and performing corresponding channel monitoring according to the first DRX parameter, which also improves the efficiency of channel monitoring.

After considering the specification and practicing the disclosure disclosed herein, one of ordinary skill in the art will easily conceive of other embodiments of the present disclosure. This disclosure is intended to cover any variations, applications, or adaptive changes of the present disclosure. These variations, applications, or adaptive changes follow the general principles of the present disclosure and include common knowledge or conventional technical means in the art not recorded in the present disclosure. The description and the embodiments are only illustrative, and the true scope and spirit of the present disclosure are set forth in the appended claims.

It should be understood that the present disclosure is not limited to the exact structure that has been described above and illustrated in the drawings, and various modifications and changes can be made without departing from the scope of the present disclosure. The scope of the present disclosure is only limited by the appended claims.

The invention claimed is:

1. A channel monitoring method, implemented by a base station, comprising:
configuring a first discontinuous reception (DRX) parameter for a terminal for channel monitoring;
determining a first power saving signal for indicating the first DRX parameter; and
sending the first power saving signal to the terminal for the terminal to determine the first DRX parameter based on the first power saving signal and perform corresponding channel monitoring based on the first DRX parameter,
wherein determining the first power saving signal for indicating the first DRX parameter comprises:
obtaining a binding relationship between power saving signal and DRX parameter; and
obtaining the first power saving signal bound to the first DRX parameter from the binding relationship.

2. The method of claim 1, wherein the first DRX parameter comprises at least one of following parameters:

a DRX wake-up duration configured for monitoring a physical downlink control channel (PDCCH) and/or monitoring a physical downlink shared channel (PDSCH);
a DRX inactivity timer configured to delay the DRX wake-up duration;
a short DRX cycle;
a long DRX cycle; and
a DRX short cycle timer configured to enter the long DRX cycle after the DRX short cycle timer expires.

3. The method of claim 1, wherein the binding relationship comprises at least one of: a one-to-one binding between power saving signal and DRX parameter and a many-to-one binding between power saving signal and DRX parameter.

4. The method of claim 1, further comprising: configuring the binding relationship for the terminal; adding the binding relationship to a first system message or first dedicated signaling; and sending the first system message or the first dedicated signaling to the terminal for the terminal to obtain the binding relationship from the first system message or the first dedicated signaling.

5. The method of claim 1, wherein the first power saving signal comprises the first DRX parameter or indication information for characterizing the first DRX parameter.

6. The method of claim 5, further comprising:
configuring a DRX candidate parameter set for the terminal;
adding the DRX candidate parameter set to a second system message or second dedicated signaling; and
sending the second system message or the second dedicated signaling to the terminal for the terminal to obtain the DRX candidate parameter set from the second system message or the second dedicated signaling and determine the first DRX parameter corresponding to the indication information based on the DRX candidate parameter set and the first power saving signal.

7. The method of claim 1, wherein the first power saving signal is a wake-up signal (WUS) or a go to sleep signal (GTS).

8. A channel monitoring method, implemented by a terminal, comprising:
receiving a first power saving signal for indicating a first discontinuous reception (DRX) parameter sent by a base station, wherein the first DRX parameter is a DRX parameter configured by the base station for the terminal for channel monitoring;
determining the first DRX parameter based on the first power saving signal; and
performing corresponding channel monitoring based on the first DRX parameter,
wherein determining the corresponding first DRX parameter based on the first power saving signal comprises:
obtaining a binding relationship between power saving signal and DRX parameter; and
obtaining the first DRX parameter bound to the first power saving signal from the binding relationship.

9. The method of claim 8, wherein
the binding relationship is a binding relationship between different power saving signals and different DRX parameters configured by the base station for the terminal, and
the binding relationship comprises a one-to-one binding between power saving signal and DRX parameter and/or a many-to-one binding between power saving signal and DRX parameter.

10. The method of claim 8, wherein performing the corresponding channel monitoring based on the first DRX parameter comprises:
- determining that a DRX parameter currently used for the channel monitoring is a second DRX parameter, and the second DRX parameter is different from the first DRX parameter;
- adjusting the DRX parameter currently used for the channel monitoring from the second DRX parameter to the first DRX parameter; and
- using the first DRX parameter to perform the corresponding channel monitoring.

11. The method of claim 8, wherein performing the corresponding channel monitoring based on the first DRX parameter comprises:
- determining whether the first DRX parameter comprises all DRX parameters required for the channel monitoring;
- in response to determining that the first DRX parameter comprises all the DRX parameters required for the channel monitoring, performing the corresponding channel monitoring based on the first DRX parameter; and
- in response to determining that the first DRX parameter comprises a part of the DRX parameters required for the channel monitoring, obtaining other DRX parameter required for channel monitoring from a default DRX parameter configuration, and performing the corresponding channel monitoring based on the first DRX parameter and the other DRX parameter.

12. The method of claim 11, wherein the default DRX parameter configuration is a default parameter configured by the base station for the terminal and informed to the terminal through a system message or dedicated signaling.

13. The method of claim 8, wherein the first power saving signal comprises the first DRX parameter or indication information for characterizing the first DRX parameter; and
- determining the first DRX parameter based on the first power saving signal comprises:
  - in response to that the first power saving signal comprises the first DRX parameter, obtaining the first DRX parameter from the first power saving signal; and
  - in response to that the first power saving signal comprises the indication information for characterizing the first DRX parameter, determining the first DRX parameter corresponding to the indication information from a DRX candidate parameter set configured by the base station for the terminal.

14. A non-transitory computer-readable storage medium storing a computer program, wherein the computer program is configured to cause a base station to execute the channel monitoring method according to claim 1.

15. A non-transitory computer-readable storage medium storing a computer program, wherein the computer program is configured to cause a terminal to execute the channel monitoring method according to claim 8.

16. A channel monitoring apparatus, implemented by a base station, comprising:
- a processor;
- a memory storing processor-executable instructions;
- wherein the processor is configured to:
- configure a first discontinuous reception (DRX) parameter for a terminal for channel monitoring;
- determine a first power saving signal for indicating the first DRX parameter; and
- send the first power saving signal to the terminal for the terminal to determine the first DRX parameter based on the first power saving signal and perform a corresponding channel monitoring based on the first DRX parameter,
- wherein determine the first power saving signal for indicating the first DRX parameter comprises:
- obtain a binding relationship between power saving signal and DRX parameter; and
- obtain the first power saving signal bound to the first DRX parameter from the binding relationship.

17. A channel monitoring apparatus, implemented by a terminal, comprising:
- a processor; and
- a memory storing processor-executable instructions;
- wherein the processor is configured to execute the channel monitoring method according to claim 8.

* * * * *